Aug. 5, 1947.  B. W. TAYLOR  2,425,055
STEERING WHEEL DEVICE
Filed Oct. 12, 1944  2 Sheets-Sheet 2

Brice W. Taylor  INVENTOR.
BY Loyal J. Miller
Attorney

UNITED STATES PATENT OFFICE 2,425,055

STEERING WHEEL DEVICE

Brice W. Taylor, Oklahoma City, Okla.

Application October 12, 1944, Serial No. 558,388

2 Claims. (Cl. 74—557)

This invention relates to vehicle steering wheel "spinners," and more particularly to a heavy duty "spinner" designed to be firmly grasped by a mechanical clamping device such as a mechanical "hand" worn by persons who have lost their own hand.

Usual steering wheel "spinners" consist of an upstanding pivot pin rigidly mounted upon the steering wheel, and a knob rotatably carried by the pin. This type of spinner is practical when used by a person possessing his physical hands, but is entirely useless to a person who is forced to use a mechanical clamping device in lieu of a lost hand.

The prime object of the present invention is to provide a steering wheel "spinner" designed in such a manner that it may be firmly and positively engaged by a mechanical "hand."

Most "spinners" of common use are not designed particularly for strength, and therefore are practical only if used when the vehicle is actually in motion. They will soon wear out or become broken if used when the vehicle is stationary, for instance in getting into and out of parking spaces, and the like.

It is therefore another object of the present invention to provide a device of this class which is sufficiently sturdy to endure, even though called upon to act under all circumstances as the sole medium for rotating the steering wheel.

A further object is to provide a device of this class which may be attached in various locations upon the steering wheel, so that it may be operated by either the right or left arm of the driver.

Other objects will be apparent from the following description, when taken in connection with the accompanying two-sheet drawing, wherein.

Like characters of reference designate like parts in all the figures.

In the drawings.

Figure 1:
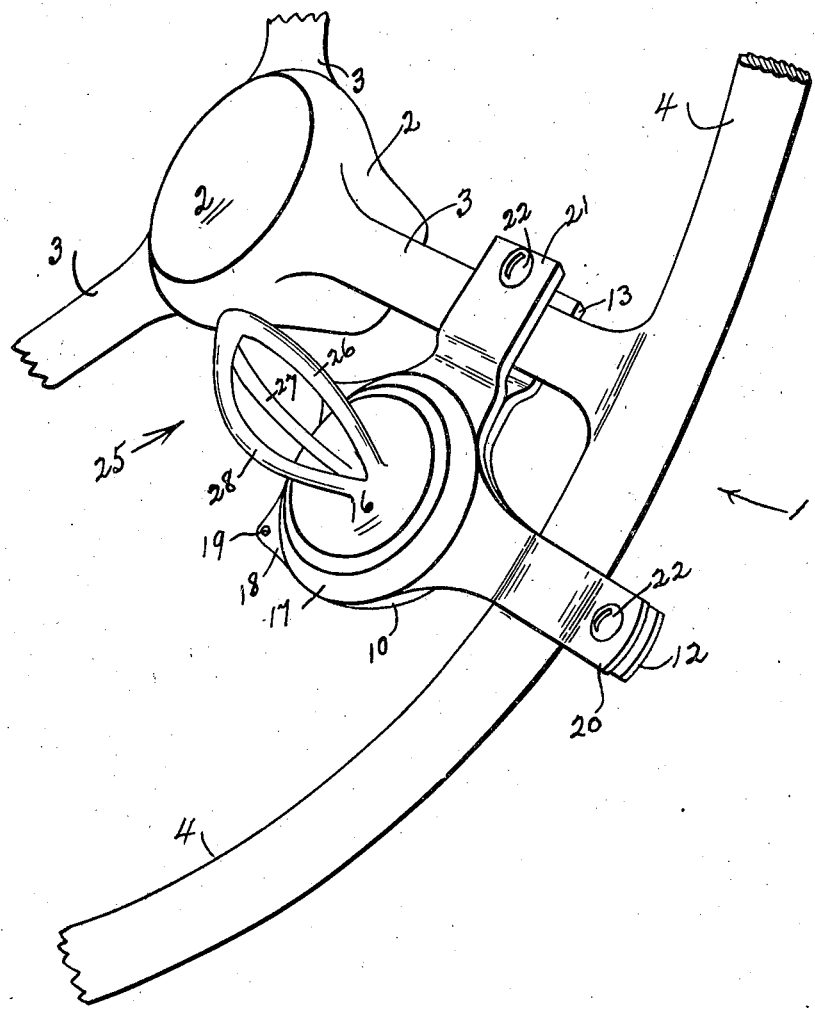
Figure 1 is a fragmentary perspective view of a typical vehicle steering wheel, one of the embodiments of the invention being shown operatively installed thereon.
Figure 2:
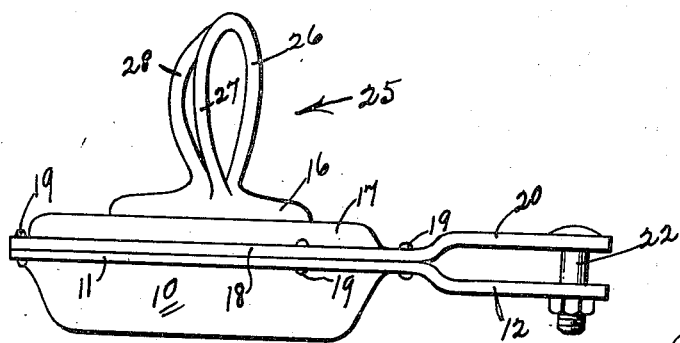
Figure 2 is an elevational view of the device.

The reference numeral 1 indicates, as a whole, a typical vehicle steering wheel, having a usual hub 2, from which radiate a plurality of spokes 3, the outer ends of which rigidly support a usual rim 4.

The device of the present invention consists substantially of a cup-shaped body or housing 10 having an annular flange 11 surrounding its rim, and having integral with said rim a pair of outwardly projecting arms 12 and 13 which are radially spaced from each other at approximately a ninety degree angle.

Figure 4:
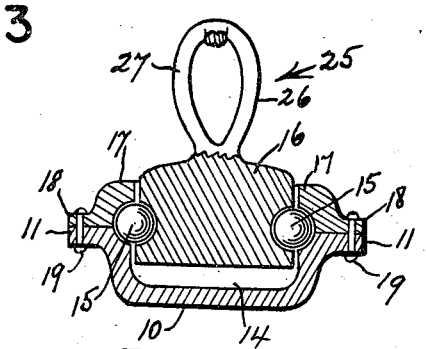
Figure 4 is an elevational sectional view of the device.

The upper inside surface of the rim of the body 10 has an annular groove (Fig. 4) which surrounds the cavity 14 of the body 10, and which is arcuate in cross-section to complementally receive a plurality of bearing balls 15.

A solid rotatable element or rotor 16, having a peripheral groove to envelope a portion of each of the bearing balls 15 is rotatably mounted in the cavity 14 of the body 10, and a bearing cap 17 is provided on the housing 10 to retain the bearing balls in place as shown. The cap 17 has an inner annular groove to envelope peripheral portions of the bearing balls, and has an exterior outwardly projecting annular flange 18 which coincides with the flange 11 of the body 10. A plurality of radially spaced rivets or other detents 19 act to hold the cap 17 firmly mounted upon the body 10. It is obvious that when the cap 17 is installed upon the body 10, the bearing balls 15 act to prevent removal of the rotor 16, and at the same time act as an anti-friction bearing for journalling the rotor for rotation in the body.

The cap 17 further has two rigid outwardly projecting arms 20 and 21 which are radially spaced to coincide with the arms 12 and 13 respectively of the body 10.

The outer portions of the arms 12 and 20, and of the arms 13 and 21, are bent apart to provide a space between each pair. This space is provided for the purpose of permitting each pair of arms to straddle either the steering rim 4 or one of the spokes 3, as best shown in Fig. 1. Bolts 22 act to hold the arms clamped upon the steering wheel spoke and rim in an obvious manner.

As a means for receiving the grasping or clamping engagement of a typical "hand," the upper surface of the central portion of the rotor 16 is equipped with an upstanding grasping member which is indicated as a whole by the reference numeral 25.

The member 25 may be shaped or designed to complementally fit, or positively engage, any desired type of usual mechanical "hand," and in the embodiment of Figs. 1, 2, 3, and 4, preferably consists of an upstanding elongated loop formed by two side legs 26 and 27 which are integrally joined together at their upper portions. The loop formed by the legs 26 and 27 lies in a single vertical plane, and extending arcuately from the top of the loop downwardly to the upper surface of the rotor, there is provided a third rib or leg 28. The leg 28 is integrated with the rotor 16 and the upper ends or portions of the legs 26 and 27, but lies in a radial position at approximately ninety degrees from the legs 26 and 27.

Figure 3:
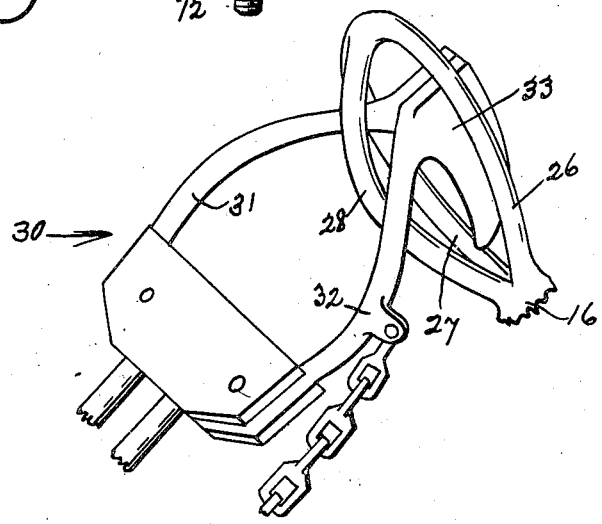
Figure 3 is a perspective view of a mechanical "hand" operatively engaged with the device.

The above described member 25, capable of being grappled, is particularly designed to be grasped by a mechanical "hand" 30 of the type shown in Fig. 3. This particular "hand" includes two clamping arms 31 and 32 each of which is provided with a grasping plate 33, the two of which are substantially identical. The arms 31 and 32 may be moved apart or may be held firmly together according to the will of the wearer. It is not deemed necessary herein to describe in detail the operating structure of the "hand" 30, it being only necessary to point out that the "hand" is operable by the wearer.

In operation, the "spinner" is attached rigidly to the steering wheel 1 by tightening the detents 22. The arms 31 and 32 of the mechanical "hand" 30 are separated to straddle the arcuate leg 28 of the member 25, and are then closed together and inserted within the loop formed by the legs 26 and 27 of the member 25.

When in this position, the mechanical "hand" is wedged firmly between the legs 26 and 27, and the arms 31 and 32 of the "hand" engage each side of the leg 28. The driver can therefore exert turning pressure upon the steering wheel in any radial direction with relation thereto. He can push, pull, or press side-wise upon the wheel, without any danger whatsoever of the "hand" becoming dislodged from the member 25.

It is obvious that all mechanical hands are not identically designed, and that the grasping member 25 may well have to be shaped differently to complementally engage different types of mechanical "hands." For instance, some "hands" have grasping plates, the meeting faces of which form a corrugated or knurled cavity. For such hands the embodiment of Fig. 5 is provided.

In this embodiment the looped grasping member 25 has been supplanted with an upstanding substantially rectangular grasping member 35 which is exteriorly knurled. No loop has been shown in this embodiment, but if desired, the loop formed by the legs 26 and 27 of the first described embodiment could well be provided also in the second embodiment.

Other shapes of grasping members can well be provided to complementally engage different types of mechanical "hands," but such members to be efficient, should be so designed that the mechanical "hand" may exert turning pressure upon the steering wheel in all radial directions without danger of becoming dislodged therefrom.

It is pointed out that the device has been illustrated in Fig. 1 as being connected to the right hand spoke and the right hand portion of the rim of the steering wheel. This is the position in which it would be installed for use by a person having a mechanical "hand" upon his right arm. If desired, the device may well be installed in a similar manner on the left hand spoke and rim portion of the steering wheel.

From the foregoing description, it is thought obvious that a steering wheel "spinner" has been disclosed which will accomplish all of the purposes for which it is intended.

I claim:

1. The combination with a vehicle steering wheel, of: a rotatable element; means for operably mounting the element upon the wheel; and an upstanding member rigidly carried by the element, said member including an upstanding loop; a rigid rib extending from the top to the bottom of the loop, whereby the clamping portion of a mechanical "hand" may be placed about the rib and within the loop for rotating the steering wheel.

2. The combination with a vehicle steering wheel, of: a rotatable element; means for operably mounting the element upon the wheel; and an upstanding member rigidly carried by the element, said member including an upstanding loop; a rigid arcuate rib extending from the top to the bottom of the loop, whereby the clamping portion of a mechanical "hand" may be placed about the rib and within the loop for rotating the steering wheel.

BRICE W. TAYLOR.

REFERENCES CITED

The following references are of record in the file of this patent:

UNITED STATES PATENTS

| Number | Name | Date |
|---|---|---|
| 1,884,448 | Whitfield | Oct. 28, 1932 |

FOREIGN PATENTS

| Number | Country | Date |
|---|---|---|
| 681,251 | France | Jan. 28, 1930 |
| 519,369 | Great Britain | Mar. 26, 1940 |
| 18,428 | Great Britain | Aug. 15, 1911 |